(12) United States Patent
Olrog

(10) Patent No.: US 8,595,310 B2
(45) Date of Patent: Nov. 26, 2013

(54) METHOD, APPARATUS AND COMPUTER PROGRAM PRODUCT FOR PRESENCE DATA UPDATES

(75) Inventor: Christian Thomas Olrog, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 467 days.

(21) Appl. No.: 12/965,248

(22) Filed: Dec. 10, 2010

(65) Prior Publication Data

US 2011/0145384 A1 Jun. 16, 2011

Related U.S. Application Data

(60) Provisional application No. 61/285,276, filed on Dec. 10, 2009.

(51) Int. Cl.
*G06F 15/16* (2006.01)
(52) U.S. Cl.
USPC .......................................... 709/207; 709/224
(58) Field of Classification Search
USPC ................................................ 709/207, 224
See application file for complete search history.

(56) References Cited

U.S. PATENT DOCUMENTS

| | | | | |
|---|---|---|---|---|
| 2008/0133742 A1* | 6/2008 | Southiere et al. | ............ | 709/224 |
| 2009/0088144 A1* | 4/2009 | Beadle et al. | ................ | 455/419 |
| 2009/0147772 A1* | 6/2009 | Rao et al. | ...................... | 370/352 |

FOREIGN PATENT DOCUMENTS

EP 1672856 A1 6/2006

OTHER PUBLICATIONS

Wegscheider, F. "Minimizing Unnecessary Notification Traffic in the IMS Presence System." IEEE 1st International Symposium on Wireless Pervasive Computing, Piscataway, NJ, US, Jan. 16, 2006.

* cited by examiner

*Primary Examiner* — David Lazaro
(74) *Attorney, Agent, or Firm* — Coats and Bennett PLLC

(57) ABSTRACT

Embodiments herein include a method executed in a terminal of a multimedia system. The multimedia system is accessible to terminals using any of a plurality of access technologies and comprises a presence server for recording presence data of users of those terminals. The method comprises changing an update state of the terminal from a low update state to a high update state when a high priority event is detected, and changing the update state of the terminal from a high update state to a low update state when a low priority event is detected. When the terminal is in the high update state, the method includes presenting to a user of the terminal more presence data of other users than that presented when the terminal is in the low update state.

15 Claims, 11 Drawing Sheets

METHOD, APPARATUS AND COMPUTER PROGRAM PRODUCT FOR PRESENCE DATA UPDATES

RELATED APPLICATIONS

This application claims priority to U.S. Provisional Application Ser. No. 61/285,276, filed Dec. 10, 2009, and International Application No. PCT/SE2010/051187, filed Nov. 11, 2010, both of which are incorporated herein by reference in their entirety.

TECHNICAL FIELD

The present invention generally relates to presence data of users of terminals of a multimedia system being capable of using a plurality of access technologies for the terminals.

BACKGROUND

In IP Multimedia Subsystems, users can be made aware of other users' presence data, such as being available, in a meeting, in a phone call etc.

However such presence data updates require resources and drain batteries of terminals subscribing to updates. It is therefore desirable to reduce resource requirements, such as network traffic, for presence data updates.

SUMMARY

An object of the invention is to reduce resource requirements for presence data updates.

A first embodiment comprises a method executed in a terminal of a multimedia system. The multimedia system comprises a presence server for recording presence data of users of terminals of the multimedia system being capable of using a plurality of access technologies for the terminals. The method comprises changing an update state of the terminal from a low update state to a high update state when a high priority event is detected, changing the update state of the terminal from a high update state to a low update state when a low priority event is detected, and when the terminal is in the high update state, presenting more presence data of other users compared to when the terminal is in the low update state. By introducing a low update state and a high update state, it is possible to reduce presence updates in the low update state, while the high update state presence updates are unaffected. In other words, by defining the transitions between the low update state and the high update state, resource requirements for presence updates are greatly reduced while the user experience is not made much worse.

The low priority event may be selected from a group comprising a detection that the terminal is roaming, expiration of an inactivity timer of the terminal, a detection in the terminal that an application for presenting the presence data loses focus, detection of a remaining battery power level of the terminal being below a threshold level, and a detection that the terminal is stowed.

The high priority event may be selected from a group comprising a detection of user activity within an application for presenting the presence data, a detection that the application for presenting presence data receives focus and a detection that the terminal is taken out of a stowed position.

An application in the terminal for presenting presence data may store a list of users of the multimedia system, wherein only presence data of users on the list is presented.

The list of users may be divided into a high priority user list and a low priority user list, and the method may further comprise presenting more presence data of users on the high priority user list when the terminal is in the low update state.

When the terminal is in the low update state, presence updates may be throttled.

When the terminal is in the low update state only presence updates of certain content types could be allowed.

A second embodiment of the invention comprises a computer program for a terminal of a multimedia system. The computer program comprises computer program code which, when executed on the terminal, causes the terminal to change an update state of the terminal from a low update state to a high update state when a high priority event is detected, change the update state of the terminal from a high update state to a low update state when a low priority event is detected, and present more presence data of other users compared to when the terminal is in the low update state when the terminal is in the high update state.

A third embodiment of the invention comprises a computer program product comprising a computer program according to the second embodiment and a computer readable means on which the computer program is stored.

A fourth embodiment of the invention comprises a terminal of a multimedia system. The multimedia system comprises a presence server for recording presence data of users of terminals of the multimedia system being capable of using a plurality of access technologies for the terminals. The terminal comprises a high priority state updater arranged to change an update state of the terminal from a low update state to a high update state when a high priority event is detected, a low priority state updater arranged to change the update state of the terminal from a high update state to a low update state when a low priority event is detected, and a presence data presenter arranged to, when the terminal is in the high update state, present more presence data of other users compared to when the terminal is in the low update state.

The low priority event may be selected from a group consisting of one or more of the events of: a detection that the terminal is roaming, an expiry of an inactivity timer of the terminal, a detection in the terminal that an application for presenting the presence data loses focus, a detection of a remaining battery power level of the terminal being below a threshold level, and a detection that the terminal is stowed.

The high priority event may be selected from a group consisting of one or more of the events of: a detection of user activity within an application for presenting the presence data, a detection that the application for presenting presence data receives focus and a detection that the terminal is taken out of the stowed position.

The presence data presenter may be arranged to store a list of users of the multimedia system, wherein only presence data of users on the list may be presented.

The low priority state updater may be arranged to throttle presence updates.

The low priority state updater may be arranged to only allow presence updates of certain content types.

A fifth embodiment of the invention comprises a method executed in a resource list server of a multimedia system. The multimedia system comprises a presence server for recording presence data of users of terminals of the multimedia system being capable of using a plurality of access technologies for the terminals. The method comprises receiving a signal indicating a change of an update state of a terminal from a low update state to a high update state, receiving a signal indicating a change of the update state of the terminal from a high update state to a low update state, and when the terminal is in the high update state, send more presence data of other users to the terminal compared to when the terminal is in the low update state.

A sixth embodiment of the invention comprises a computer program for a resource list server of a multimedia system. The computer program comprising computer program code which, when run on the resource list server, causes the resource list server to receive a signal indicating a change of an update state of a terminal from a low update state to a high update state, receive a signal indicating a change of the update state of the terminal from a high update state to a low update state, and when the terminal is in the high update state, send more presence data of other users to the terminal compared to when the terminal is in the low update state.

A seventh embodiment of the invention comprises a computer program product comprising a computer program according to the sixth embodiment and a computer readable means on which the computer program is stored.

An eighth embodiment of the invention comprises a resource list server of a multimedia system. The multimedia system comprises a presence server for recording presence data of users of terminals of the multimedia system being capable of using a plurality of access technologies for the terminals. The resource list server comprises a signal receiver arranged to receive a signal indicating a change of an update state of a terminal from a low update state to a high update state, and to receive a signal indicating a change of the update state of the terminal from a high update state to a low update state, and a transmitter arranged, and when the terminal is in the high update state, to send more presence data of other users to the terminal compared to when the terminal is in the low update state.

It is to be noted that any feature of the first, second, third, fourth, fifth, sixth, seventh and eighth embodiments may, where appropriate, be applied to any other of these embodiments.

Generally, all terms used in the application are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

One or more aspects of the present invention will now be described more fully hereinafter with reference to the accompanying drawings, in which certain example embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
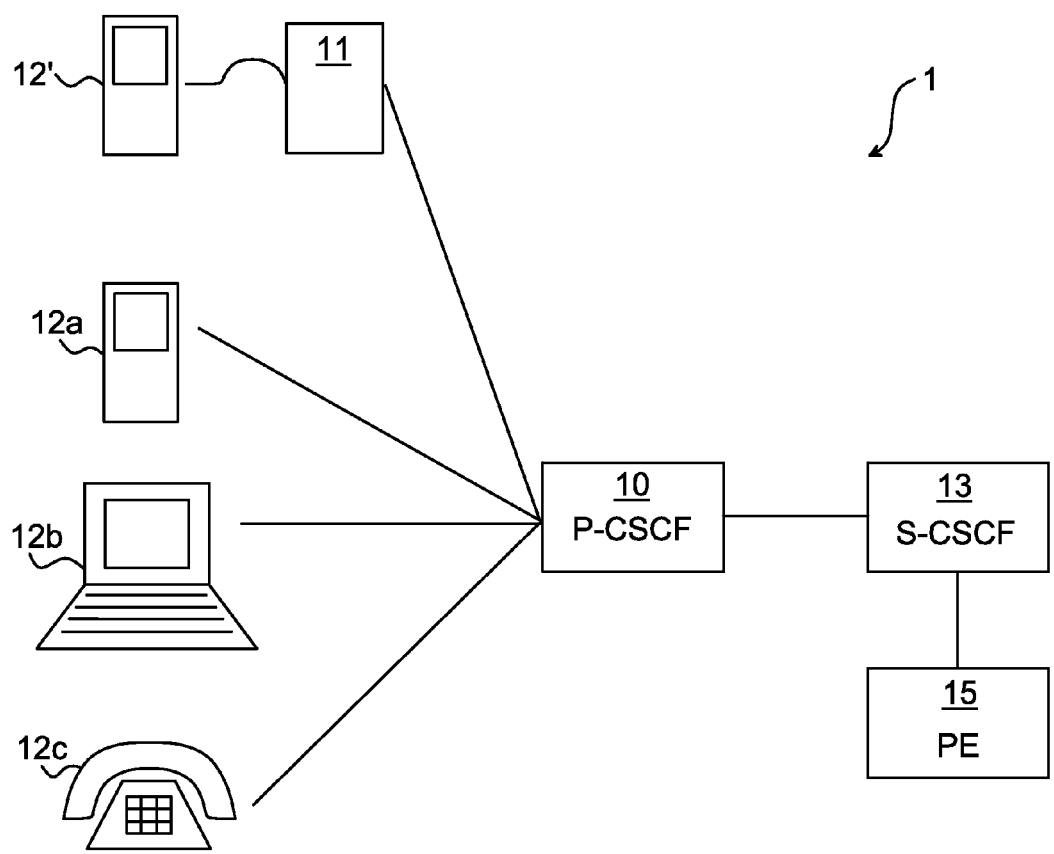
FIG. 1 is a schematic diagram showing an overview of an environment where an embodiment of the invention can be applied.

FIG. 1 is a schematic diagram showing an overview of an environment where an embodiment of the invention can be applied. A system 1 complying with the 3GPP (3rd Generation Partnership Project) standard for IP Multimedia Subsystem (IMS) is presented. Other equivalent communication systems can equally well be used. Various terminals 12a-c and 12' can be used in the system 1 to allow end user access using various access technologies for the terminals such as mobile (cellular) networks, wireless local area networks, or wired networks such as Ethernet/ADSL (Asymmetric Digital Subscriber Line). Here, user terminals are exemplified by a mobile terminal 12a, such as a smart phone, PDA (personal digital assistant) or mobile phone, a computer 12b, such as a stationary or portable personal computer, and a traditional telephone 12c.

Additionally, through the use of a web client enabler 11, clients 12', which in themselves do not comply with the IMS standard, can be connected to the system. The web client enabler 11 acts as a gateway. The clients 12a-c, 12' are connected to a Proxy Call Session Control Function (P-CSCF) 10. The P-CSCF allows the terminal to connect with the rest of the IMS system 1.

The P-CSCF 10 is connected to a Serving Call Session Control Function (S-CSCF) 13. The S-CSCF is a central signalling node of the IMS system 1.

A presence enabler (PE) 15 records presence data for users of the terminals 12a-c, 12'. The presence enabler 15 can record automatically updated presence data or user updated presence data. Examples of automatically updated presence data include that a user is in a phone call, that a user is in a meeting (if calendar information is present, e.g. in one of the clients 12a-c, 12'), and that a user just got out of a meeting. Examples of user updated presence data include that a user is having lunch, or a free text presence data update such as "working on client proposal". Optionally, the user can indicate the current presence data (such as in a meeting, out for lunch, on vacation, etc.) in a similar way to how presence data is coded in terminals of private automatic branch exchange (PABX) systems. Presence data can also be obtained from other systems, internal or external to the installation, e.g. online social networking services such as FaceBook, Linkdedln or Twitter, or from a pre-existing PABX system.

Figure 2:
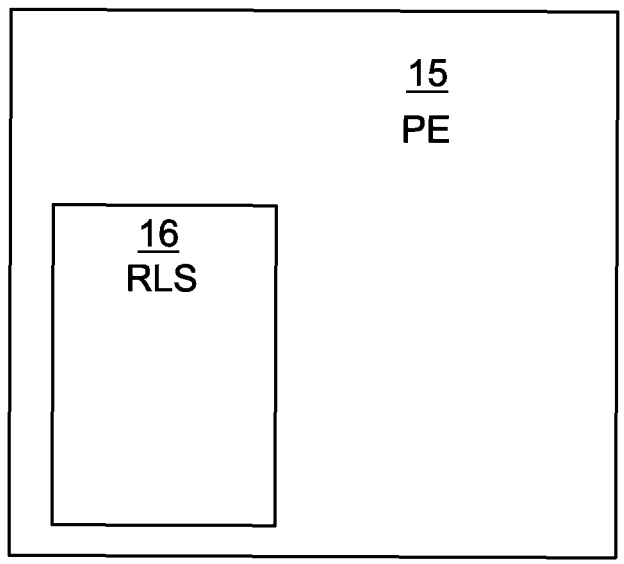
FIG. 2 illustrates how a presence enabler (PE) may comprise a resource list server (RLS)

FIG. 2 illustrates how the presence enabler (PE) 15 may comprise a resource list server (RLS) 16. Optionally, the resource list server RLS 16 is connected, but separate from, the presence enabler 15. The resource list server 16 stores user lists for users of the IMS system 1 of FIG. 1.

User lists are used to indicate what other users that a particular user is interested in, similar to buddy lists of instant messaging clients. For example, in a corporate setting, a particular user could have all colleagues of the same team on his/her user list. The user can add and remove other users from his/her user list as needed, e.g. through a web interface to the presence enabler 15 and/or resource list server 16, or using a dedicated client application on one of the terminals 12a-c, 12'.

In one embodiment, each user can maintain a high priority list and a low priority list, where presence updates of users on the low priority list are presented in a more restrictive way compared to presence updates of users on the high priority list.

Figure 3:
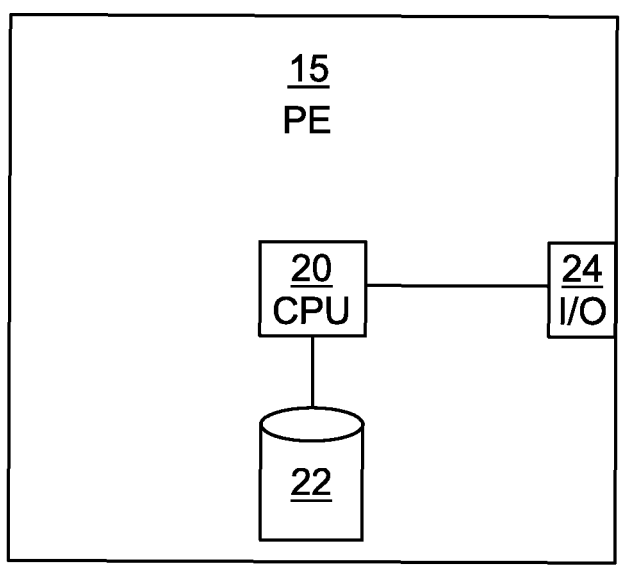
FIG. 3 is a schematic diagram of components of the presence enabler of FIGS. 1 and 2.

FIG. 3 is a schematic diagram of components of the presence enabler 15 of FIGS. 1 and 2.

A controller 20 is provided using any suitable central processing unit (CPU), microcontroller, digital signal processor (DSP), etc., capable of executing software instructions stored in a computer readable media 22, e.g., memory. The computer readable media 22 can be any combination of read and write memory (RAM) and read only memory (ROM). The memory 22 also comprises persistent storage, which, for example, can be any single one or combination of magnetic memory, optical memory, or solid state memory. The computer readable media 22 can be co-located with memory for storing user list data of users of the IMS system 1.

An input/output interface 24 is provided to allow the presence enabler 15 to interact with other components, such as the S-CSCF 13 or indirectly clients 12a-c, 12'. The input/output interface 24 can for example be a network interface such as an Ethernet interface or an optical fibre input/output communication interface. In the case that the presence enabler 15 is co-located with another device, such as the resource list server 16, the controller 20, the computer readable media 22 and input/output interface 24 can be shared with the other device. Optionally, a user interface is provided (not shown) for operator usage. Additionally or alternatively, the presence enabler 15 can be operated remotely or locally using the input/output interface 24.

The presence enabler 15 can be integrated in one unit, or it can be separated into several separate units, e.g. for reasons of upgradeability, ease of implementation or redundancy. In the case that there are several units that make up the presence enabler 15, some components may be present in more compared to one unit, such as the controller 20 and/or the storage 22.

Figure 4:
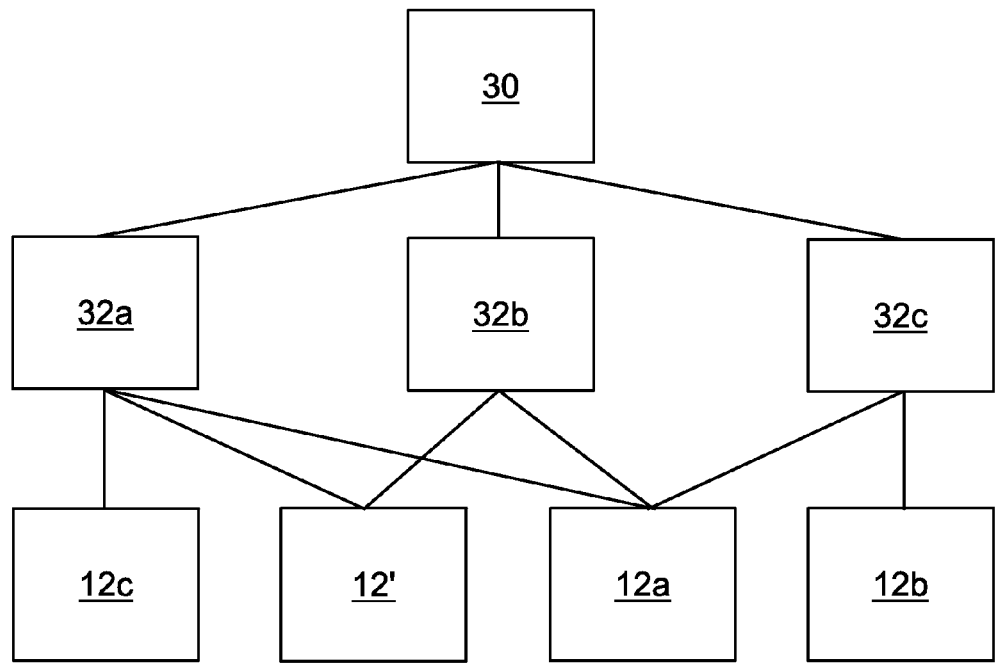
FIG. 4 is a schematic diagram illustrating the relationships between user, services and terminals.

FIG. 4 is a schematic diagram illustrating the relationships between user, services and terminals. For each user 30, there can be a number of services 32a-c and a number of terminals 12a-c, 12'. In this example, we can say that there are three services, a voice call service 32a, a video call service 32b and an instant messaging service 32c. Furthermore, the user has access to four terminals, a traditional telephone 12c, a mobile phone 12', a smart phone 12a and a personal computer 12b. As can be seen from the connections between the services 32a-c and the terminals 12a-c, 12', the traditional phone 12c can be used for the voice call service 32a; the mobile phone 12' can be used for the voice call service 32a and the video call service 32b; the smart phone can be used for the voice call service 32a, the video call service 32b and the instant messaging service 32c, while the personal computer 12b can only be used for the instant messaging service 32c. In other words, terminals can flexibly be used for any service according to their capability.

Figure 5:
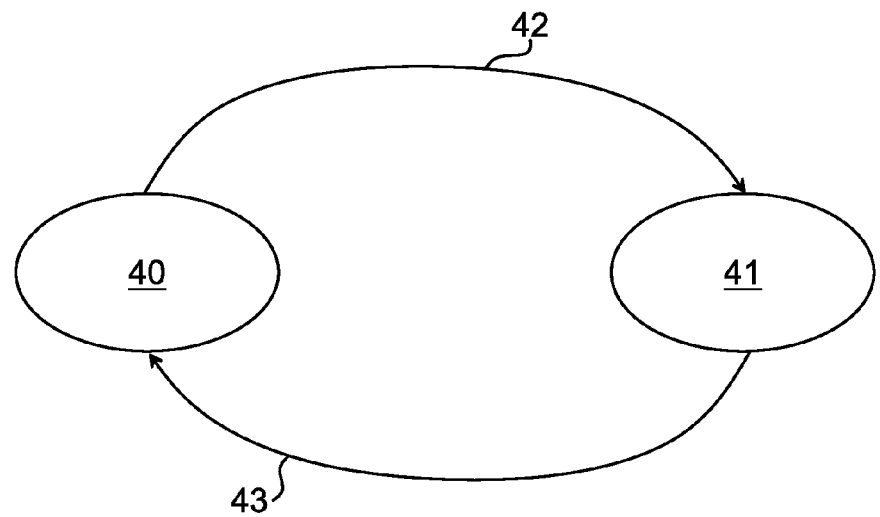
FIG. 5 is a state diagram illustrating different update states of the terminal according to an embodiment of the present invention.

FIG. 5 is a state diagram illustrating different update states of the terminal 12a-c, 12' according to an embodiment of the present invention. For the terminal 12' which uses the web client enabler 11, the web client enabler 11 can be responsible for the illustrated state machine. In other cases, the terminal 12a-c is responsible to keep the state machine up to date.

There are two update states here, a low update state 40 and a high update state 41. Each one of the terminal 12a-c, 12' has an application which presents presence data of other users on the user list, where the user list is for the user of the terminal and is stored in the resource list server 16. As an example, let us say that a user A is running an application which presents presence data for users B, C and D. Conventionally, whenever presence data changes for, e.g. user B, this is directly updated in the application of user A.

Using the update states, when the terminal of user A is in the high update state 41, any presence updates for users B, C or D are directly, or at regular intervals, sent to the application of the terminal of user A.

However, in the low update state 40, presence data updates are more restricted. This can for example be effected by throttling, where presence data updates are sent only once during a specified time period. Alternatively or additionally, content filtering can be applied in the low update state, e.g. by only letting presence data that is specifically entered by a user to be sent. By applying this restriction on presence updates in the low update state 40, communication is greatly reduced with no great effect on the user experience.

This has several benefits. When the terminal is in the low update state, communication is reduced in the network which reduces congestion and dimensioning requirements. Moreover, energy usage in the terminal is reduced which results in less battery power usage and thus longer battery life.

The state machine changes 43 from the high update state 41 to the low update state 40 e.g. when roaming in a foreign network with a mobile terminal, which reduces data usage costs for the user. This state change 43 can also occur if the user does not use the application for presence data updates, as indicated by an inactivity timer expiring or by the application losing focus in the terminal (in other words, that another application takes priority in the user interface of the terminal). Another situation is when the terminal senses that it is stowed, such as put in a pocket or purse, e.g. using motion sensors (e.g. accelerometers) and/or proximity sensors of the terminal, at which a low update state 40 should be assumed. Also, the state machine can change 43 to low update state 40 when a remaining battery power level goes below a threshold level. Any combination of these events can be used to trigger a state change 43 from the high update state 41 to the low update state 40.

The state machine changes 42 from the low update state 40 to the high update state 41, e.g., when the application that presents presence data detects user activity in the application, or if the application receives focus again, or if it is sensed that the terminal is taken out of the stowed position, such as the pocket or purse. Optionally, when entering the high update state 41, any new presence data of users on the user list are sent to the terminal.

Any updates to the state machine for a terminal of a user can be communicated to the resource list server 16, to allow the resource list server 16 to know how much or how little information to send to each terminal.

Figure 6A:
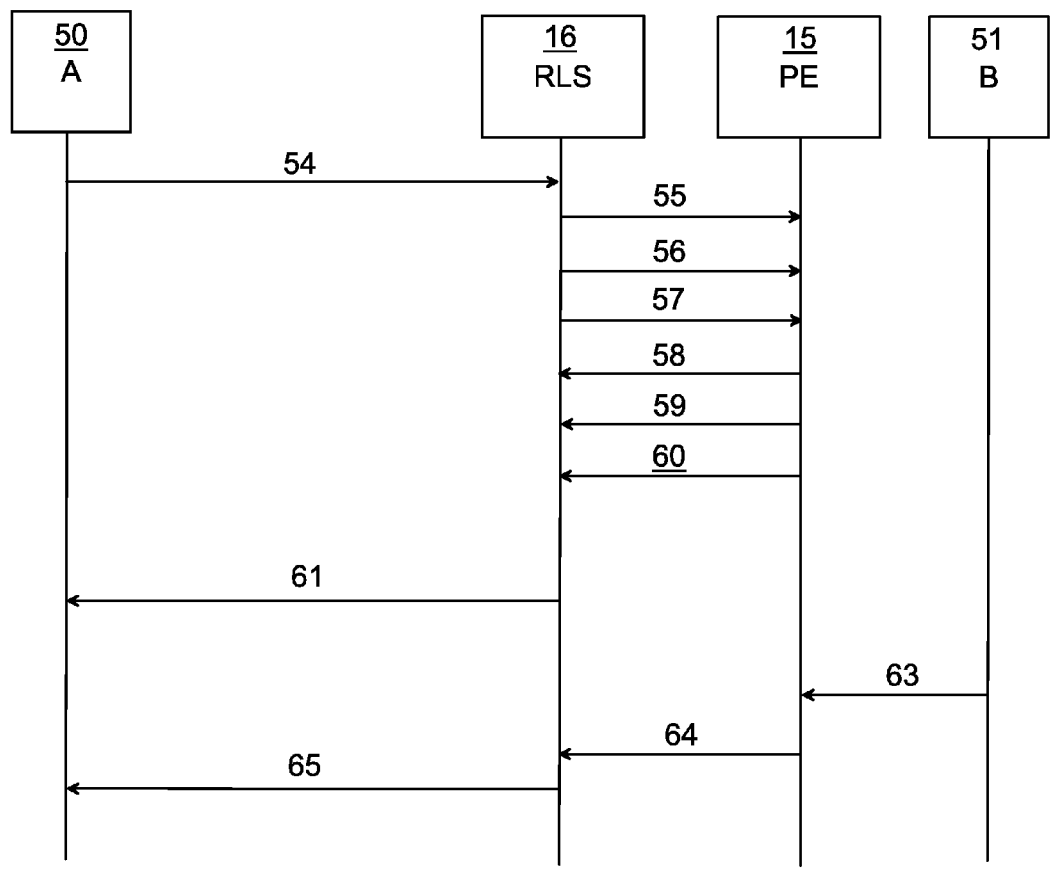
FIGS. 6A and 6B are sequence diagrams illustrating communication in embodiments of the present invention.
Figure 6B:
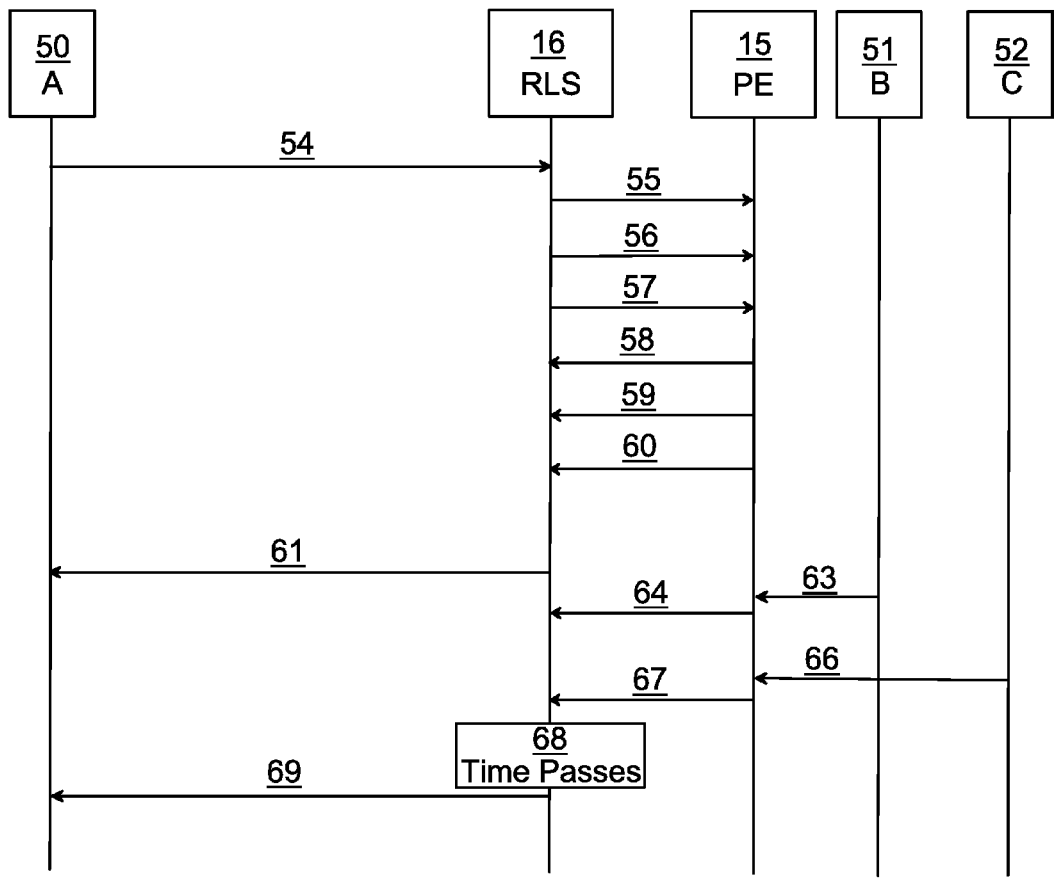

FIGS. 6A and 6B are sequence diagrams illustrating communication in embodiments of the present invention. The presence updates can occur using SIP (Session Initiation Protocol), XCAP (XML (Extensible Markup Language) Configuration Access Protocol) or any other suitable protocol. In these diagrams, for clarity reasons, A, B and C refer to the terminals of users A, B and C and not the users themselves. In other words, it is the terminals that perform the communication indicated in the diagrams, not the users. Terminal A 50 thus refers to the terminal that user A currently uses.

FIG. 6A illustrates presence updates in the high update state 41 of FIG. 5. The communication in FIG. 6A starts e.g. when an application showing presence data is started on a terminal A 50. Terminal A 50 first sends a subscribe command 54 to the resource list server 16 to get all current updates of the user list for user A. The resource list server 16 retrieves the user list for user A which includes users B, C and D. The resource list server 16 then sends subscribe messages 55, 56, 57 to the presence enabler 15 for each of the users on the list. This will make the presence enabler 15 send any presence data now and updates in the future to the resource list server 16. The presence enabler 15 thus responds to the resource list server 16 with notifications 58, 59, 60 of the current presence data of the users in question. Once all presence data has been received by the resource list server 16, it sends a notification message 61 to terminal A 50 with all presence data for all the users on the user list for A. When there is a presence data update from terminal B 51, this is communicated in a publication message 63 to the presence enabler 15, which forwards this information in a notification message 64 to the resource list server 16. The resource list server 16 finally forwards the presence data to the terminal A 50 in a notification message 65.

FIG. 6B illustrates presence updates when the terminal starts in the high update state 41 and transitions to the low update state 40. The communication in FIG. 6B also starts e.g. when an application showing presence data is started on a terminal A 50. The part of the diagram ending with the resource list server 16 sending a notification message 61 to terminal A 50 with all presence data for all the users on the user list for A is identical to FIG. 6A. However after this, the user A is passive, whereby an inactivity timer expires and the terminal A 50 enters the low update state 40. In this example, presence data messages are throttled in this state, e.g. by only sending presence update messages every 30 minutes. While the terminal A 50 is in the low update state, terminal B 51 updates the presence data and publishes 63 this to the presence enabler 15 which notifies 64 the resource list server 16. Also, terminal C 52 updates the presence data and publishes 66 this to the presence enabler 15 which notifies 67 the resource list server 16. However, due to the throttle, the resource list server 16 waits 68 until 30 minutes have passed since the last update and only when this time has passed does the resource list server 16 send a notification 67 of presence updates for B and C to terminal A 50.

It is to be noted that the throttle of the resource list server 16 is configurable by the operator or user to balance between update frequency and resource usage.

Furthermore, user A can have two user lists on the resource list server 16: one list of normal priority users and one list of high priority users. For example, user A might need to get hold of his/her manager and puts the manager in the high priority user list. In that situation, the resource list server 16 sends presence updates to terminal A 50 immediately for users on the high priority list, even if the terminal A 50 is in a low update state. It is also possible to have more user lists with communication options set for each user list, allowing fully configurable throttling and content filtering for the various lists.

Figure 7:
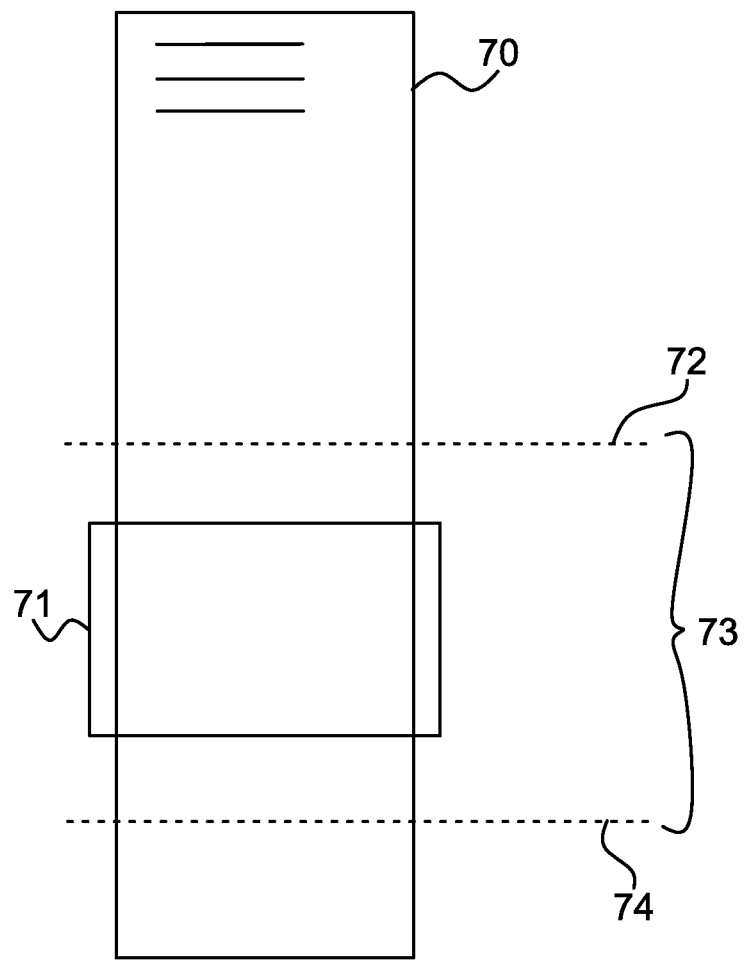
FIG. 7 shows an embodiment of the present invention applied to lists.

FIG. 7 shows an embodiment of the present invention applied to lists.

A list 70 of content, e.g. a list of employees of a company is presented on a terminal, e.g. terminal 12a of FIG. 1. The content is provided by a server. A window 71, also known as a sliding window, displays a subset of the list 70. According to the embodiment, the content within the view of the display 71 is downloaded from the server, along with content above to an upper limit 72 and below to a lower limit 74. The upper limit 72 and lower limit 74 follow the sliding window 71 when it is scrolled up or down. Optionally, while the sliding window 71 is in motion, the margins in the direction of movement can be increased. For example, if the sliding window 71 is scrolled upwards, the upper limit 72 is increased in distance from the top of the upper limit of the sliding window 71. When the sliding window 71 is stationary again, the upper limit 72 returns to a fixed distance from the upper limit of the sliding window 71.

Figure 8:
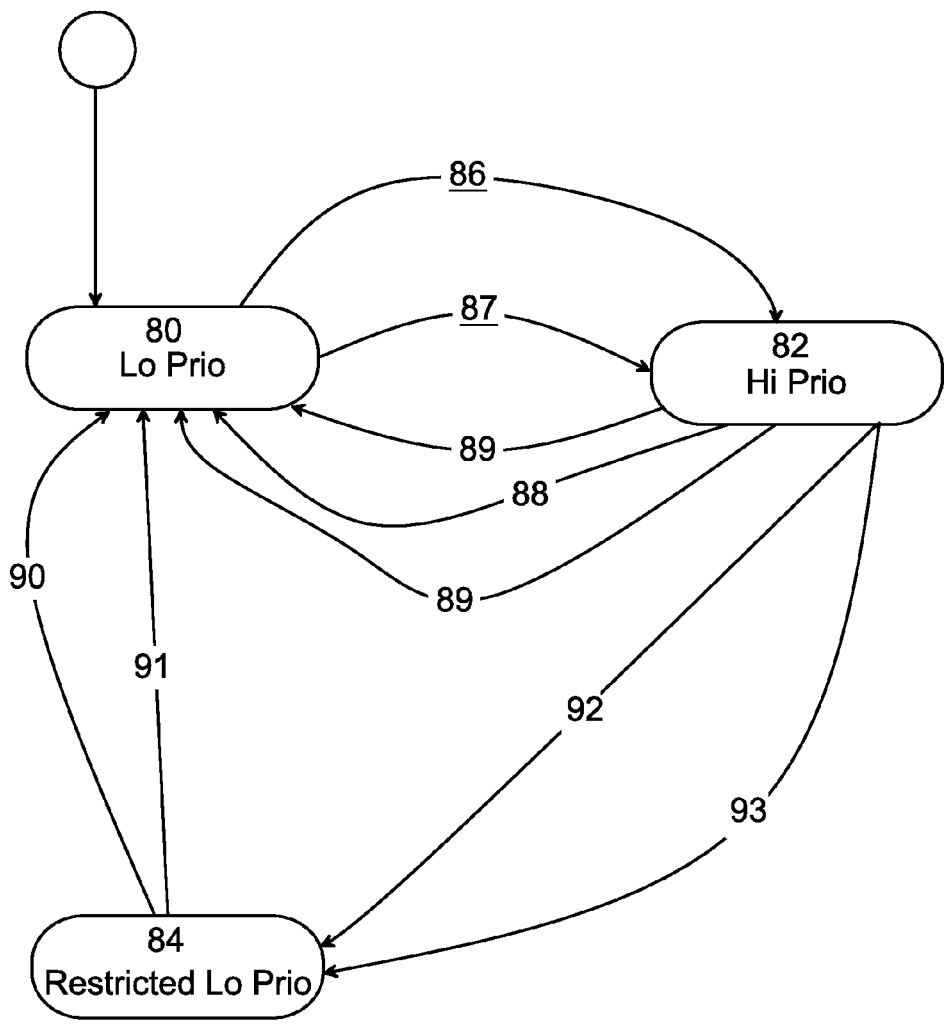
FIG. 8 shows an alternative state diagram with three update states.

FIG. 8 shows an alternative state diagram with three update states. Here, the low update state is divided into a restricted low priority state 84 and a regular low priority state 80, along with the high priority state 82. A restricted low priority state is where, for example, no or an extremely low amount of presence data is sent to the terminal. This can for example be due to international roaming or that the battery power is lower than a threshold value.

The transitions from the low priority state 80 to the high priority state 82 can e.g. be detection of terminal user activity 86, detection of foreground focus 87 of an application in the terminal that has the ability to present or act upon presence data or detection that the terminal has been taken out of a stowed location 83, such as a pocket or purse.

Conversely the transitions from the high priority state 82 to the low priority state 80 can e.g. be expiration of an inactivity timer 89, lost foreground focus 88 of an application in the terminal that has the ability to present or act upon presence data or detection of the terminal being stowed 81, e.g. in a pocket or purse.

The transitions from the high priority state 80 to the restricted low priority state 84 can e.g. be the detection of international roaming 92 or detection of low battery 93, defined as battery power less than a threshold power.

The transitions from the restricted low priority state 84 to the low priority state 80 can e.g. be a detection of higher battery power 90, defined as battery power more than a threshold power or detection of end of international roaming 91.

Figure 9:
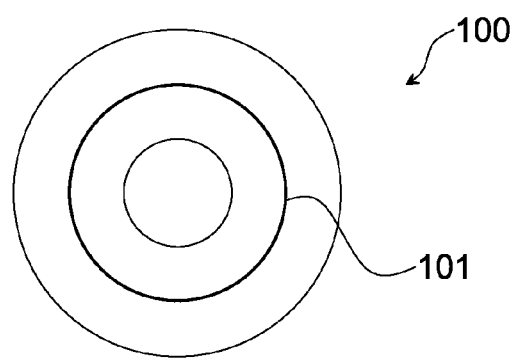
FIG. 9 shows one example of a computer program product comprising computer readable mean.

FIG. 9 shows one example of a computer program product 100 comprising computer readable means. On this computer readable means a computer program 101 can be stored, which computer program can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as memory 22 of the presence enabler 15 or memory 112 of the server terminal 12. While the computer program 101 is here schematically shown as a track on the depicted optical disk, the computer program can be stored in any way which is suitable for the computer program product.

Figure 10:
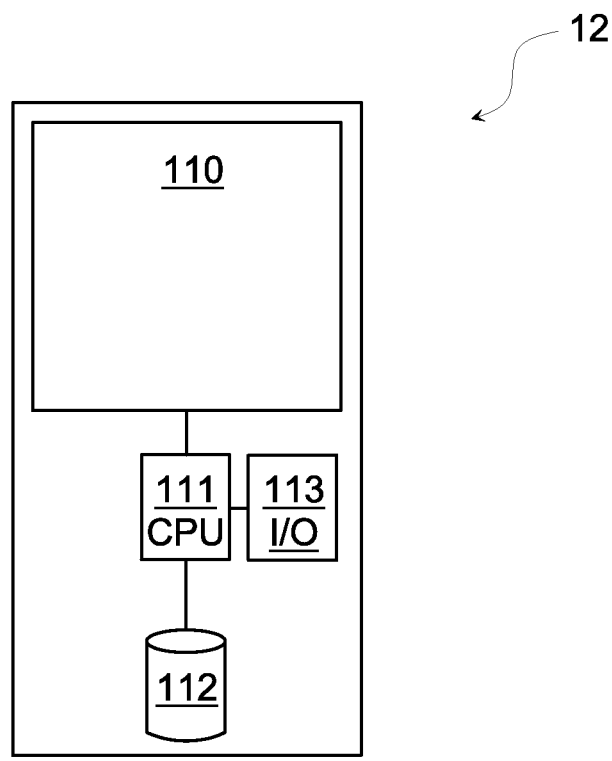
FIG. 10 is a schematic diagram of components of the terminal, such as any one of the terminals of FIGS. 1 and 4.

FIG. 10 is a schematic diagram of components of the terminal 12, such as any one of terminals 12a-c, 12' of FIGS. 1 and 4.

A controller 111 is provided using any suitable central processing unit (CPU), microcontroller, digital signal processor (DSP), etc., capable of executing software instructions stored in a computer readable media 112, e.g., memory. The computer readable media 112 can be any combination of read and write memory (RAM) and read only memory (ROM). The memory 112 also comprises persistent storage, which, for example, can be any single one or combination of magnetic memory, optical memory, or solid state memory.

An input/output interface 113 is provided to allow the terminal 12 to communicate with other network nodes, e.g. using a cellular network or a wireless local area network.

A display 110 forms part of a user interface of the terminal 12. The display can be touch sensitive and/or a separate input device (not shown) can be provided.

Figure 11:
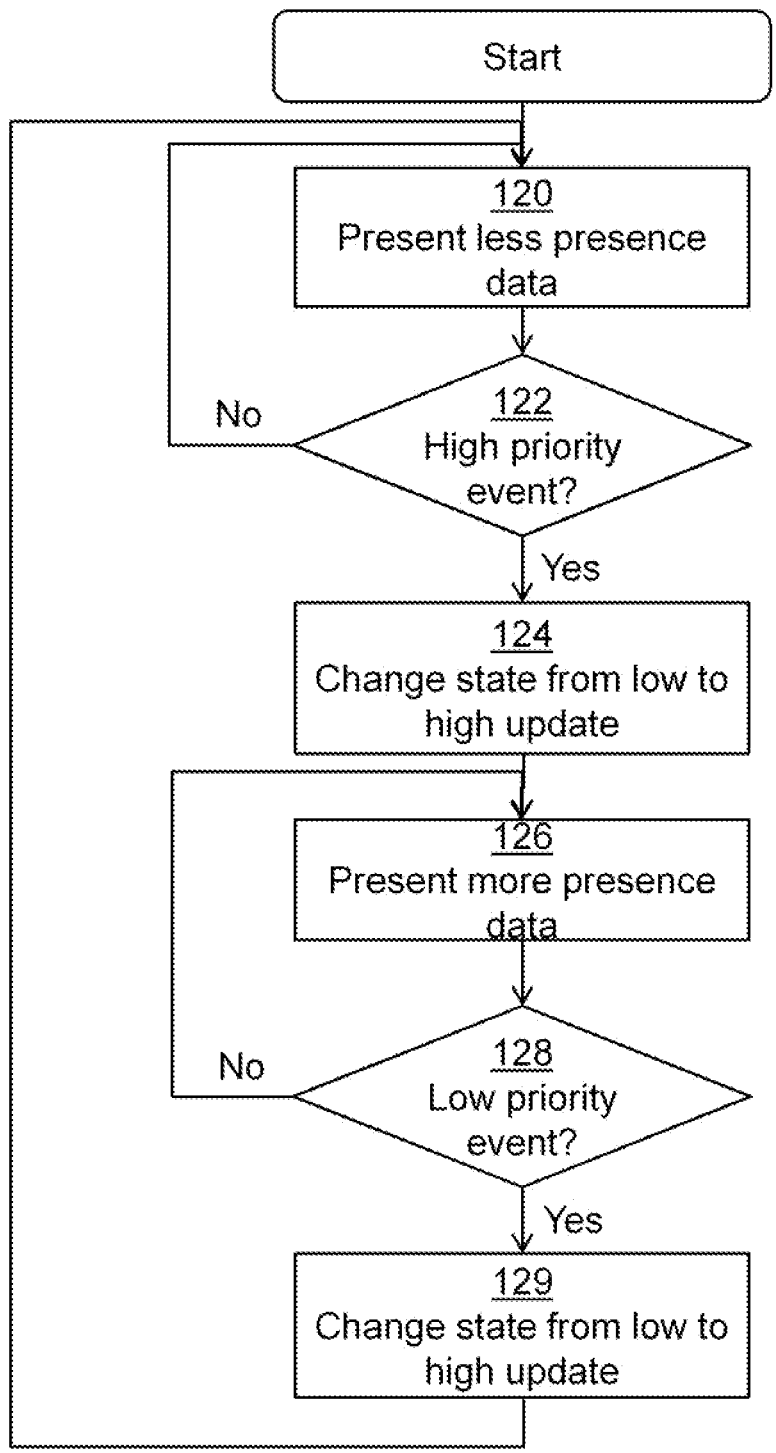
FIG. 11 is a flow chart illustrating an embodiment of a method implemented in the terminal, such as any one of terminals of FIGS. 1 and 4.

FIG. 11 is a flow chart illustrating an embodiment of a method implemented in the terminal 12, such as any one of terminals 12a-c, 12' of FIGS. 1 and 4.

In a present less presence data step 120, a relatively low amount of presence data is presented. This corresponds to the low update state 40 of FIG. 5.

In a conditional high priority event step 122, it is determined if any high priority events have occurred. For example, the high priority event can be a detection of user activity within an application for presenting the presence data, a detection that the application for presenting presence data receives focus and a detection that the terminal (12, 12a-c, 12') is taken out of the stowed position such as a pocket or purse. If a high priority event has occurred, the method continues to a change state from low to high update step 124. Otherwise, the process continues to the present less presence data step 120.

In the change state from low to high update step 124, the state of the terminal is changed from low update state to the high update state, corresponding to the state change 42 of FIG. 5. A high priority signal is also sent to the resource list server 16.

In a present more presence data step 126, a relatively high amount of presence data is presented. This corresponds to the high update state 41 of FIG. 5.

In a conditional low priority event step 128, it is determined if any low priority events have occurred. For example, the low priority event can be a detection that the terminal is roaming, an expiry of an inactivity timer of the terminal, a detection in the terminal that an application for presenting the presence data loses focus, a detection of a remaining battery power level of the terminal being below a threshold level, and a detection that the terminal is stowed. If a low priority event has occurred, the method continues to a change state from high to low update step 129. Otherwise, the process continues to the present more presence data step 126.

In the change state from high to low update step 129, the state of the terminal is changed from high update state to the low update state, corresponding to the state change 43 of FIG. 5. A low priority signal is also sent to the resource list server 16. The method then continues to the present less presence data step 120.

The method can continue until the terminal is shut down or stops functioning.

Figure 12:
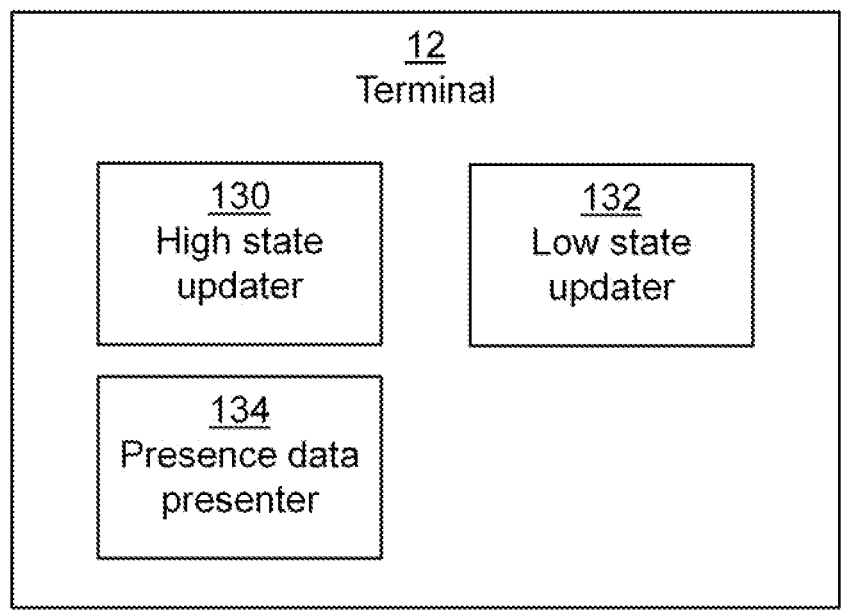
FIG. 12 is a schematic diagram showing functional modules of the terminal of FIGS. 1 and 4.

FIG. 12 is a schematic diagram showing functional modules of the terminal of FIGS. 1 and 4. The modules can be implemented using software such as a computer program executing in the terminal. All modules depend on an execution environment (see FIG. 10) which utilises a controller 111, a computer program product 112 and an I/O interface 113.

A high state updater 130 is arranged to change an update state of the terminal 12, 12a-c, 12' from a low update state 40 to a high update state 41 when a high priority event is detected. This corresponds to the state change 42 of FIG. 5. The state change is communicated to the resource list server 16.

A low state updater 132 is arranged to change the update state of the terminal (12, 12a-c, 12') from a high update state 41 to a low update state 40 when a low priority event is detected. This corresponds to the state change 43 of FIG. 5. The state change is communicated to the resource list server 16.

A presence data presenter 134 is arranged to present presence data as received from the resource list server 16. As described above, less presence data will be presented when the terminal is in the low update state 40 compared to when the terminal is in the high update state 41.

Figure 13:
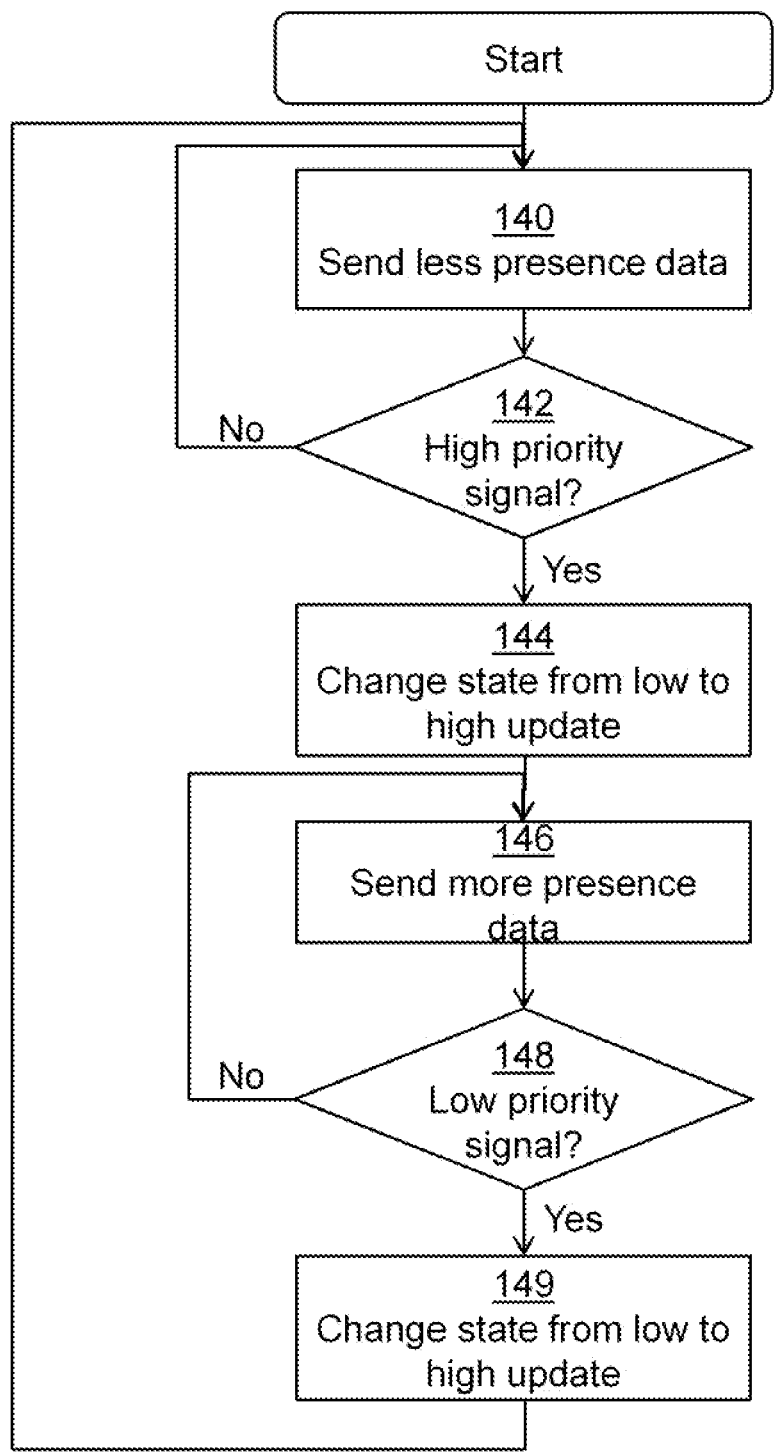
FIG. 13 is a flow chart illustrating an embodiment of a method implemented in the resource list server, such as the resource list server of FIGS. 1 and 2.

FIG. 13 is a flow chart illustrating an embodiment of a method implemented in the resource list server 16, such as the resource list server of FIGS. 1 and 2. The method concerns a method in the resource list server 16 to deal with the state of one terminal. The method occurs in parallel for as many terminals as is needed, as long as the resource list server 16 has sufficient capacity.

In a send less presence data step 140, a relatively low amount of presence data is sent from the resource list server to the terminal. This corresponds to the low update state 40 of FIG. 5.

In a conditional high priority signal step 142, it is determined if any high priority signals have been received. If a high priority signal has been received, the method continues to a change state from low to high update step 144. Otherwise, the process continues to the send less presence data step 120.

In the change state from low to high update step 144, the state of the terminal in question is changed from low update state to the high update state, corresponding to the state change 42 of FIG. 5.

In a send more presence data step 146, a relatively high amount of presence data is sent to the terminal. This corresponds to the high update state 41 of FIG. 5.

In a conditional low priority signal step 148, it is determined if any low priority signals have been received. If a low priority signal has been received, the method continues to a change state from high to low update step 149. Otherwise, the process continues to the send more presence data step 146.

In the change state from high to low update step 149, the state of the terminal is changed from high update state to the low update state, corresponding to the state change 43 of FIG. 5. The method then continues to the send less presence data step 140.

The method can continue until the terminal is disconnected or the server is not functioning.

Figure 14:
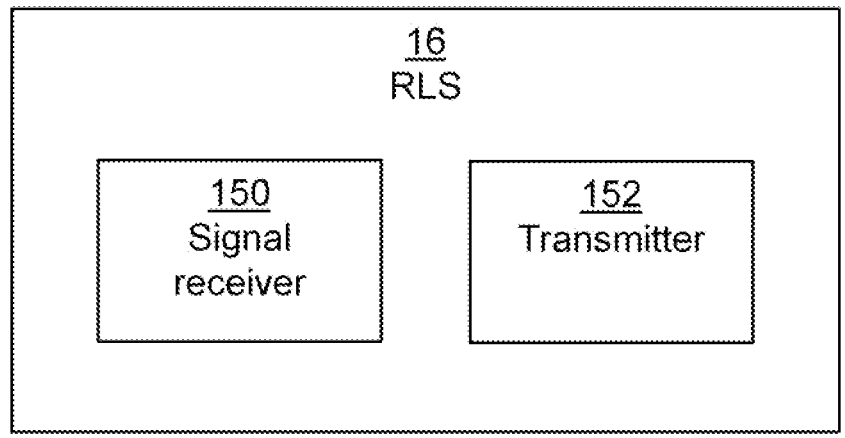
FIG. 14 is a schematic diagram showing functional modules of the resource list server, such as the resource list server of FIGS. 1 and 2.

FIG. 14 is a schematic diagram showing functional modules of the resource list server 16, such as the resource list server of FIGS. 1 and 2. The modules can be implemented using software such as a computer program executing in the terminal. All modules depend on an execution environment (see FIG. 13) which utilises a controller 20, a computer program product 22 and an I/O interface 24.

A signal receiver 150 is arranged to receive a signal indicating a change of an update state of a terminal 12, 12a-c, 12' from a low update state to a high update state, and to receive a signal indicating a change of the update state of the terminal 12, 12a-c, 12' from a high update state to a low update state.

A transmitter 152 is arranged, when the terminal 12, 12a-c, 12' is in the high update state, to send more presence data of other users to the terminal 12, 12a-c, 12' than when the terminal 12, 12a-c, 12' is in the low update state.

The invention has mainly been described above with reference to certain example embodiments. However, as is readily appreciated by a person skilled in the art, other embodiments than the ones disclosed above are equally possible within the scope of the invention, as defined by the appended patent claims.

The invention claimed is:

1. A method executed in a terminal of a multimedia system, the multimedia system accessible to terminals using any of a plurality of access technologies and comprising a presence server for recording presence data of users of those terminals, the method comprising:
   changing an update state of the terminal from a low update state to a high update state when a high priority event is detected;
   changing the update state of the terminal from the high update state to the low update state when a low priority event is detected;
   when the terminal is in the high update state, presenting to a user of the terminal more presence data of other users than that presented when the terminal is in the low update state; and
   when the terminal is in the low update state, limiting presence data of other users presented, to the user of the terminal, to only presence data that was specifically entered by the other users.

2. The method according to claim 1, wherein the low priority event comprises one or more of a detection that the terminal is roaming, an expiry of an inactivity timer of the terminal, a detection in the terminal that an application for presenting the presence data loses focus, a detection of a remaining battery power level of the terminal being below a threshold level, and a detection that the terminal is stowed.

3. The method according to claim 1, wherein the high priority event comprises one or more of a detection of user activity within an application for presenting the presence data, a detection that the application for presenting presence data receives focus, and a detection that the terminal is taken out of a stowed position.

4. The method according to claim 1, wherein said presenting comprises presenting only presence data of users on a list of users stored by an application in the terminal for presenting presence data.

5. The method according to claim 4, wherein the list of users is divided into a high priority user list and a low priority user list, and wherein when the terminal is in the low update state, said presenting comprises presenting more presence data for users on the high priority user list than that presented for users on the low priority user list.

6. The method according to claim 1, further comprising, when the terminal is in the low update state, receiving fewer updates to said presence data than that received when the terminal is in the high update state.

7. A computer program product for a terminal of a multimedia system, the computer program product stored on a non-transitory computer readable medium and comprising computer program code that, when run on the terminal, causes the terminal to:
   change an update state of the terminal from a low update state to a high update state when a high priority event is detected;
   change the update state of the terminal from the high update state to the low update state when a low priority event is detected;
   when the terminal is in the high update state, present to a user of the terminal more presence data of other users than that presented when the terminal is in the low update state; and
   when the terminal is in the low update state, limit presence data of other users presented, to the user of the terminal, to only presence data that was specifically entered by the other users.

8. A terminal of a multimedia system, the multimedia system accessible to terminals using any of a plurality of access technologies and comprising a presence server for recording presence data of users of those terminals, the terminal comprising:
   a high priority state updater configured to change an update state of the terminal from a low update state to a high update state when a high priority event is detected;
   a low priority state updater configured to change the update state of the terminal from the high update state to the low update state when a low priority event is detected;
   a presence data presenter configured to, when the terminal is in the high update state, present to a user of the terminal more presence data of other users than that presented when the terminal is in the low update state; and
   the presence data presenter further configured to, when the terminal is in the low update state, limit presence data of other users presented, to the user of the terminal, to only presence data that was specifically entered by the other users.

9. The terminal according to claim 8, wherein the low priority event comprises one or more of a detection that the terminal is roaming, an expiry of an inactivity timer of the terminal, a detection in the terminal that an application for presenting the presence data loses focus, a detection of a remaining battery power level of the terminal being below a threshold level, and a detection that the terminal is stowed.

10. The terminal according to claim 8, wherein the high priority event comprises one or more of a detection of user activity within an application for presenting the presence data, a detection that the application for presenting presence data receives focus and a detection that the terminal is taken out of the stowed position.

11. The terminal according to claim 8, wherein the presence data presenter is configured to store a list of users of the multimedia system and to present only presence data of users on the list.

12. The terminal according to claim 8, wherein the low priority state updater is configured to, when the terminal is in the low update state, receive fewer updates to said presence data than that received when the terminal is in the high update state.

13. A method executed in a resource list server of a multimedia system, the multimedia system accessible to terminals using any of a plurality of access technologies and comprising a presence server for recording presence data of users of those terminals, the method comprising:
   receiving a signal indicating a change of an update state of a terminal from a low update state to a high update state;
   receiving a signal indicating a change of the update state of the terminal from the high update state to the low update state;
   when the terminal is in the high update state, sending to the terminal more presence data of other users than that sent when the terminal is in the low update state; and when the terminal is in the low update state, limiting presence data of other users sent, to the terminal, to only presence data that was specifically entered by the other users.

14. A computer program product for a resource list server of a multimedia system, the computer program product stored on a non-transitory computer readable medium and comprising computer program code that, when run on the resource list server, causes the resource list server to:
   receive a signal indicating a change of an update state of a terminal from a low update state to a high update state;
   receive a signal indicating a change of the update state of the terminal from the high update state to the low update state;
   when the terminal is in the high update state, send to the terminal more presence data of other users than that sent when the terminal is in the low update state; and
   when the terminal is in the low update state, limit presence data of other users sent, to the terminal, to only presence data that was specifically entered by the other users.

15. A resource list server of a multimedia system, the multimedia system accessible to terminals using any of a plurality of access technologies and comprising a presence server for recording presence data of users of those terminals, the resource list server comprising:
   a signal receiver configured to receive a signal indicating a change of an update state of a terminal from a low update state to a high update state, and to receive a signal indicating a change of the update state of the terminal from the high update state to the low update state;
   a transmitter configured, when the terminal is in the high update state, to send to the terminal more presence data of other users than that sent when the terminal is in the low update state; and
   the transmitter further configured, when the terminal is in the low update state, to limit presence data of other users sent, to the terminal, to only presence data that was specifically entered by the other users.

* * * * *

UNITED STATES PATENT AND TRADEMARK OFFICE
CERTIFICATE OF CORRECTION

| | | |
|---|---|---|
| PATENT NO. | : 8,595,310 B2 | Page 1 of 1 |
| APPLICATION NO. | : 12/965248 | |
| DATED | : November 26, 2013 | |
| INVENTOR(S) | : Olrog | |

It is certified that error appears in the above-identified patent and that said Letters Patent is hereby corrected as shown below:

On the Title Page, in Column 1, below item "(60)",
insert item -- (30) Foreign Application Priority Data
November 11, 2010 (SE)................ PCT/SE2010/051187 --.

In the Drawings

In Fig. 11, Sheet 9 of 11, delete "Fig 11" and insert -- Fig. 11 --, therefor.

In Fig. 12, Sheet 10 of 11, delete "Fig 12" and insert -- Fig. 12 --, therefor.

In Fig. 14, Sheet 10 of 11, delete "Fig 14" and insert -- Fig. 14 --, therefor.

In Fig. 13, Sheet 11 of 11, delete "Fig 13" and insert -- Fig. 13 --, therefor.

In the Specification

In Column 8, Line 45, delete "high priority state 80" and insert -- high priority state 82 --, therefor.

Signed and Sealed this
Fifteenth Day of July, 2014

Michelle K. Lee
*Deputy Director of the United States Patent and Trademark Office*